ical Patent [19] [11] 4,014,702
Hinata et al. [45] Mar. 29, 1977

[54] SILVER HALIDE PHOTOGRAPHIC EMULSION

[75] Inventors: Masanao Hinata; Masanaga Ohki; Hartuo Takei; Akira Sato; Akira Ogawa, all of Minami-ashigara, Japan

[73] Assignee: Fuji Photo Film Co., Ltd., Minami-ashigara, Japan

[22] Filed: July 21, 1975

[21] Appl. No.: 597,606

Related U.S. Application Data

[63] Continuation-in-part of Ser. No. 491,187, July 24, 1974, abandoned.

[30] Foreign Application Priority Data

July 24, 1973 Japan .................. 49-83339

[52] U.S. Cl. .................. 96/122; 96/126; 96/140
[51] Int. Cl.² .................. G03C 1/08
[58] Field of Search .................. 96/122, 140

[56] References Cited

UNITED STATES PATENTS

| 3,625,698 | 12/1971 | Sakazume et al. .................. 96/122 |
| 3,698,910 | 10/1972 | Sakazume et al. .................. 96/122 |
| 3,703,377 | 11/1972 | Sakazume et al. .................. 96/122 |

*Primary Examiner*—J. Travis Brown
*Attorney, Agent, or Firm*—Sughrue, Rothwell, Mion Zinn & Macpeak

[57] ABSTRACT

A silver halide photographic emulsion containing a spectrally sensitizing amount of a sensitizing dye represented by the general formula (I)

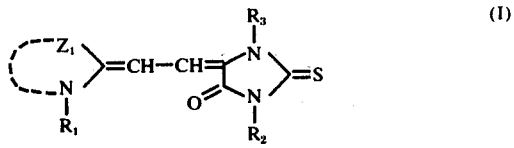

and a sensitizing dye represented by the formula (II)

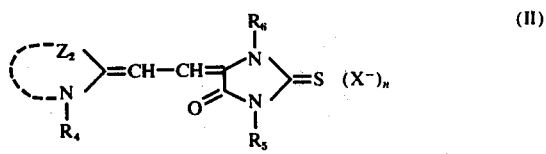

wherein $Z_1$ and $Z_2$ each is an atomic group necessary to complete a benzoxazole ring or a naphthoxazole ring; $R_1$ is an alkyl group or an allyl group; $R_2$ is an alkyl group or an allyl group; $R_3$ is an unsubstituted lower alkyl group, a hydroxyalkyl group or a carboxyalkyl group; $R_4$ is same as $R_1$; $R_5$ is an alkyl group, an allyl group or a phenyl group; $R_6$ is an alkoxycarbonylalkyl group, a hydroxyalkoxyalkyl group, an acyloxyalkoxyalkyl group, an N-(N,N-dialkylaminoalkyl)carbamoylalkyl group, an N-(N,N,N-trialkylammonium)carbamoylalkyl group or an N,N,N-trialkylammoniumalkyl group; $X^-$ is an acid anion; and $n$ is 0 or 1.

11 Claims, 3 Drawing Figures

SILVER HALIDE PHOTOGRAPHIC EMULSION

This application is a continuation-in-part of Ser. No. 491,187 filed July 24, 1974, now abandoned.

BACKGROUND OF THE INVENTION

1. Field of the Invention

The present invention relates to a spectrally sensitized silver halide photographic emulsion, and, more particularly, it relates to a silver halide emulsion supersensitized with a combination of two types of dimethinemerocyanine spectral sensitizers.

2. Description of the Prior Art

In some light-sensitive photographic materials such as high speed orthochromatic lith-type light-sensitive photographic materials, it has been required that the green-sensitivity be increased and the red-sensitivity be reduced.

It is generally known in the art that polymethinecyanine dyes such as cyanine, merocyanine, hemicyanine, etc. can be used for spectrally sensitizing a silver halide photographic emulsion. For example, in order to increase the sensitivity to light in the green spectral region, oxathiohydaontoin dimethinemerocyanine dyes represented by the general formula (I) described hereinafter are known as disclosed in U.S. Pat. Nos. 3,384,486, 3,765,901 and 3,625,698, and Japanese Patent Publication No. 18105/71.

However, the green sensitivity of silver halide emulsion spectrally sensitized with the a spectral sensitizer of the general formula (I) is still practically insufficient.

SUMMARY OF THE INVENTION

Therefore, an object of the invention is to provide a silver halide photographic emulsion having an increased green sensitivity and no substantial red sensitivity.

Another object of the invention is to provide a silver halide photographic emulsion containing a combination of spectral sensitizers which do not cause stain after development.

It has been found that the above objects of the invention can be attained by employing the spectral sensitizer represented by the general formula (I)

and a novel oxathiohydantoin dimethinemerocyanine dye represented by the general formula (II)

wherein $Z_1$ and $Z_2$ each is an atomic group necessary to complete a benzoxazole ring or a naphthoxazole ring; $R_1$ is an alkyl group or an allyl group; $R_2$ is an alkyl group or an allyl group; $R_3$ is an unsubstituted lower alkyl group, a hydroxyalkyl group or a carboxyalkyl group; $R_4$ is the same as $R_1$ $R_5$ is an alkyl group, an allyl group or a phenyl group; $R_6$ is an alkoxycarbonyl group, a hydroxyalkoxyalkyl group, an acyloxyalkoxyalkyl group, an N-(N,N-dialkylaminoalkyl)carbamoylalkyl group, an N-(N,N,N-trialkylammonium)carbamoylalkyl group or an N,N,N-trialkylammoniumalkyl group; $X^-$ is an acid anion; and $n$ is O or 1.

It has been further found that the sensitivity in the inherent sensitivity region of silver halide is increased by the combination of the two type of spectral sensitizers. This is a surprising phenomenon because the inherent sensitivity of silver halide is generally reduced by the addition of spectral sensitizers.

DETAILED DESCRIPTION OF THE INVENTION

In the above general formula (I), $Z_1$ is an atomic group necessary for completing a benzoxazole ring or a naphthoxazole ring which can be substituted with a halogen atom, a lower alkyl group (e.g., having 1 to 4 carbon atoms), a lower alkoxy group (e.g., having 1 to 4 carbon atoms in the alkyl moiety thereof), a hydroxyl group, a trifluoromethyl group, a lower alkoxycarbonyl group (e.g., having 1 to 4 carbon atoms in the alkyl moiety thereof), an acyl group (e.g., having the formula RCO— wherein R represents an alkyl group having 1 to 6 carbon atoms or a phenyl group) or a monoaryl group. The ring formed by $Z_1$ can be, for example, a benzoxazole, 5-fluorobenzoxazole, 5-chlorobenzoxazole, 5-bromobenzoxazole, 5-methoxybenzoxazole, 5-hydroxybenzoxazole, 5-trifluoromethylbenzoxazole, 5-methoxy-carbonylbenzoxazole, 5-acetylbenzoxazole, 5-phenylbenzoxazole, 6-methylbenzoxazole, 6-hydroxybenzoxazole, 5,6-dimethylbenzoxazole, 5-chloro-6-methylbenzoxazole, α-naphthoxazole, β, β-naphthoxazole or β-naphthoxazole ring.

The substituent $R_1$ represents an alkyl group [preferably, an unsubstituted alkyl group or a substituted alkyl group employed in conventional cyanine dyes having 1 to 8 carbon atoms, in which the alkyl moiety has preferably 1 to 4 carbon atoms, for example, a methyl group, an ethyl group, a propyl group, a butyl group, a hydroxyalkyl group (such as a β-hydroxyethyl group or a γ-hydroxypropyl group), an alkoxyalkyl group (such as a β-methoxyethyl group or a γ-methoxypropyl group), an acyloxyalkyl group (such as a β-acetoxyethyl group or a Ω-propionyloxybutyl group), a carboxyalkyl group (such as a β-carboxyethyl group or an ω-carboxybutyl group), an alkoxycarbonylalkyl group (such as a methoxycarbonylmethyl group, a β-methoxycarbonylethyl group or an ω-ethoxycarbonylbutyl group), a sulfoalkyl group (such as a β-sulfoethyl group, a γ-sulfopropyl group, a γ-sulfobutyl group or a δ-sulfobutyl group), a sulfonatoalkyl group (such as a β-sulfonatoethyl group or an ω-sulfonatobutyl group) or an aralkyl group (such as a benzyl group, a phenethyl group, a p-carboxybenzyl group, a p-carboxyphenethyl group, a p-sulfobenzyl group or a p-sulfophenethyl group)] or an allyl group such as a vinylmethyl group.

The substituent $R_2$ represents an alkyl group (preferably, an unsubstituted alkyl group or a substituted alkyl group conventially employed for cyanine dyes and having 1 to 4 carbon atoms, for example, a methyl group, an ethyl group, a propyl group or a butyl group and the substituted alkyl groups as described for $R_1$) or an allyl group such as a vinylmethyl group.

The substitutent $R_3$ represents preferably an unsubstituted alkyl group having 1 to 4 carbon atoms such as an ethyl group, a hydroxyalkyl group (prefereably, having an alkyl moiety of 1 to 4 carbon atoms) such as a β-hydroxyethyl group, or a carboxyalkyl group (preferably, having an alkyl moiety of 1 to 4 carbon atoms) such as a β-carboxyethyl group.

In the above general formula (II), $Z_2$ and $R_4$ each is the same as $Z_1$ and $R_1$ in the general formula (I), respectively. Thus substituent $R_5$ represents an alkyl group, preferably an unsubstituted alkyl group or a substituted alkyl group conventionally employed for cyanine dyes and having 1 to 4 carbon atoms, for example, a methyl group, an ethyl group, a propyl group or a butyl group and the substituted alkyl groups as described for $R_1$, an allyl group such as a vinyl methyl group or a phenyl group.

The substituent $R_6$ is an alkoxycarbonylakyl group (preferably, having an alkyl moiety of 1 to 4 carbon atoms, for example, a methoxycarbonylmethyl group or an ethoxycarbonylmethyl group), a hydroxyalkoxyalkyl group or an acyloxyalkoxyalkyl group (preferably, having an alkyl moiety of 1 to 4 carbon atoms, for example, a hydroxymethoxymethyl group, a 2-hydroxyethoxymethyl group, a 2-(2-acetoxy)ethyl group or an acetoxymethoxymethyl group), an N-(N,N-dialkylaminoalkyl) carbomoylalkyl group (preferably having an alkyl moiety of 1 to 4 carbon atoms and in which the alkyl moieties of the N,N-dialkyl group can be linked with each other to form a ring such as a 6-membered ring) such as an N-[3(N,N-dimethylamino)propyl] carbamoylmethyl group, an N-[2-N,N-diethylamino)ethyl] carbamoylmethyl group, an N-[3-(morpholino)-propyl] carbamoylmethyl group or an N-[3-(piperidino]propyl]-carbamoylmethyl group, an N-(N,N,N-trialkylammoniumalkyl)carbamoylalkyl group (preferably having an alkyl moiety of 1 to 4 carbon atoms and in which two N-alkyl groups can be linked with each other to form a ring such as a 6-membered ring) such as an N-[3-(N,N,N-trimethylammonium)propyl]carbamoylmethyl group, an N-[3-(N,N,N-triethylammonium)propyl]carbamoylmethyl group, an N-[3-(N-methylmorpholinonium)propyl]carbamoylmethyl group or an N-[3-(N-methylpiperidinonium)-propyl]carbamoylmethyl group, or an N,N,N-trialkylammoniumalkyl group (preferably having an alkyl moiety of 1 to 4 carbon atoms) such as an N,N-diethyl-N-methylammoniumethyl group or an N,N,N-triethylammoniumethyl group. However, when $R_6$ is an alkoxycarbonylalkyl group, $R_5$ is a monoaryl group such as a phenyl group.

The substituent X is an acid anion forming a salt together with an ammonium cation, for example, a mineral acid anion such as chloride, bromide, iodide, etc. and an organic acid anion such as p-toluenesulfonate, methyl sulfate or ethyl sulfate.

Typical examples of the sensitizers represented by the general formula (I) are as follows, but the invention is not to be construed as being limited to these examples.

Typical examples of the sensitizers represented by the general formula (II) are as follows but the invention is not to be construed as being limited to these examples.

-continued

II-3 492 mμ

II-4 492 mμ

II-5 491 mμ

II-6 497 mμ

II-7 490 mμ

II-8 488 mμ

II-9 509 mμ

II-10 494 mμ

-continued

II-11 486 mμ

II-12 500 mμ

II-13 487 mμ

II-14 493 mμ

II-15 490 mμ

II-16 488 mμ

II-17 488 mμ

II-18 490 mμ

II-19 492 mμ

The sensitizer represented by the general formula (I) and (II) can be synthesized using the method disclosed in U.S. Pat. No. 3,625,698 and U.S. Pat. Application Ser. No. 464,094, filed Apr. 25, 1974, respectively.

A silver halide photographic emulsion containing the two types of sensitizers, in combination, is suitable for use in various light-sensitive materials, for example, lith-type light-sensitive materials such as lithographic films, photographic light-sensitive materials for office copying use, negative type light-sensitive materials for camera use, light-sensitive materials for television use, light-sensitive materials for spectral photography, light-sensitive materials for astrophotography, light-sensitive materials for aerial photography, high resolving light-sensitive materials and diffusion transfer light-sensitive materials.

The silver halide photographic emulsion used in the invention can be prepared using conventional techniques, that is, by precipitation of the silver halide using the single-jet method, the double-jet method or a combined method thereof and ripened. Examples of silver halide include silver chloride, silver bromide, silver iodide or a mixture thereof, e.g. silver chloroiodide. A preferable silver halide is, silver chlorobromide or silver chloroiodobromide containing, for example, about 0.1 to 4 mol% silver iodide. The average diameter of silver halide particles is preferably about 0.04 to 2 microns which is measured by the projected area method or the numerical average method.

The crystal shapes of the silver halide used in the invention can be varied widely and is not be limited to any particular shapes. For example, they can be the well-known (1 1 1) plane crystals and can be advantageously the (1 0 0) plane crystals. Determination of these shapes is well known in the art.

The combined sensitizers of the invention are useful for the optical sensitization of irregular particles, and are very useful for regular particles which are used for litho-type photographic films. The sensitizers are particularly useful for the optical sensitization of regular silver chlorobromide or silver chlorobromoiodide crystals having a (1 0 0) plane.

The silver halide photographic emulsions of the invention can be subjected to conventionally employed sensitizing methods using conventional techniques, including chemical sensitization such as, e.g., using the natural sensitizers in gelatin, sulfur sensitizers such as the thiosulfates and sulfur compounds such as disclosed in U.S. Pat. Nos. 1,574,944, 2,278,947, 2,410,689, 3,189,458, 3,501,313 and French Pat. No. 2,059,245, reduction sensitizers such as the stannous salts as disclosed in U.S. Pat. 2,487,850, amines as disclosed in U.S. Pat. Nos. 2,518,698, 2,521,925, 2,521,926, 2,419,973, and 2,419,975, imino-amino-methane sulfinic acid as disclosed in U.S. Pat. No. 2,983,610, silanes as disclosed in U.S. Pat. No. 2,694,637, and the method disclosed by H. W. Wood in *Journal of Photographic Science*, 1, (1953) p.163, or gold sensitization or sensitization with Group VIII metals such as using a gold complex as disclosed in U.S. Pat. No. 2,399,083, or platinum, iridium, ruthenium, rhodium, palladium noble metals as disclosed in U.S. Pat. Nos. 2,448,060, 2,540,086, 2,566,245, and 2,566,263, and selenium compounds as disclosed in U.S. Pat. No. 3,297,446, etc. A combination of these methods can be employed, if desired.

Typical examples of chemical sensitizers are sulfur sensitizers such as allyl thiocarbamide, thiourea, sodium thiosulfate or cystine, noble metal sensitizers such as potassium choroaurate, sodium aurous thiosulfate or potassium chloroplatinate, and reduction sensitizers such as tin chloride, or phenylhydrazine. Chemical sensitizers such as polyoxyethylene derivatives, polyoxypropylene derivatives or compounds having a quaternary ammonium group can also be used for the silver halide photographic emulsion of the invention.

Further, the photographic emulsion of the invention can contain, for example, stabilizers, and anti-foggants, e.g., mercury compounds such as the mercury complexes disclosed in U.S. Pat. No. 2,728,664, the mercury salt of benzthiazole disclosed in U.S. Pat. No. 2,728,667, the mercury addition compounds as disclosed in U.S. Pat. Nos. 2,728,663 and 2,732,302, organic mercury compounds as disclosed in U.S. Pat. No.

2,728,665, azoles such as the benzthiazolium salts as disclosed in U.S. Pat. No. 2,131,038; aminodihydroxydioxane as disclosed in U.S. Pat. No. 3,380,829, compounds having epoxy groups, as disclosed in U.S. Pat. Nos. 3,047,394 and 3,091,537, compounds having active halogens, such as 2,4-dichloro-6-hydroxy-1,3,5-triazine as disclosed in U.S. Pat. No. 3,325,287, mucohalic acids such as mucochloric acid and mucobromic acid as disclosed in U.S. Pat. No. 2,080,019, bis-(methane sulfonic acid ester) as disclosed in U.S. Pat. No. 2,726,162, sulfonyl compounds such as bis-(benzene sulfonyl chloride) as disclosed in U.S. Pat. No. 2,725,295, aziridine compounds, divinylsulfones as disclosed in U.S. Pat. No. 2,579,871, compounds having active olefinic bonds such as divinyl ketone as disclosed in German Pat. No. 872,153, compounds having acryloyl groups as disclosed in U.S. Pat. Nos. 3,255,000 and 3,635,718, British Pat. No. 994,869 and German Pat. No. 1,090,427, alkylene bis-maleimide as disclosed in U.S. Pat. No. 2,992,109, isocyanates as disclosed in U.S. Pat. No. 3,103,437, carbodiimides as disclosed in U.S. Pat. No. 3,100,704, isooxazole derivatives as disclosed in U.S. Pat. Nos. 3,321,313 and 3,543,292, polymeric hardeners such as dialdehyde starch as disclosed in U.S. Pat. No. 3,057,723, and inorganic hardeners, such as chrom alum, chrom acetate, zirconium sulfate, etc.; surface active agents, e.g., nonionic surface active agents, such as saponin, polyethyleneglycol, polyethylene glycol/polypropylene glycol adducts as disclosed in U.S. Pat. No. 3,294,540, polyalkyleneglycol ethers, esters, and amides as disclosed in U.S. Pat. No. 2,831,766, anionic surface active agents, such as alkyl carboxylic acid salts, alkyl sulfonic acid salts, alkylbenzene benzimidazole as disclosed in U.S. Pat. No. 2,324,123, nitrobenzimidazole as disclosed in British Pat. No. 403,789, nitroaminobenzimidazole as disclosed in U.S. Pat. No. 2,324,123, mercaptothiazole derivatives as disclosed in U.S. Pat. No. 2,824,001, mercaptobenzthiazole derivatives as disclosed in U.S. Pat. No. 2,697,099, mercaptoimidazole derivatives as disclosed in U.S. Pat. No. 3,252,799, mercaptooxadiazole as disclosed in U.S. Pat. No. 2,843,491, mercaptothiadiazole as disclosed in U.S. Pat. No. 1,758,576, phenylmercaptotetrazole as disclosed in U.S. Pat. No. 2,403,927, mercaptopyrimidine as disclosed in U.S. Pat. No. 2,304,962, mercaptotriazine as disclosed in U.S. Pat. No. 2,476,536, mercaptotetrazaindene as disclosed in British Pat. No. 893,428, thiosalicylic acid as disclosed in U.S. Pat. No. 2,377,375, thiobenzoic acid as disclosed in U.S. Pat. No. 3,226,231, sugar mercaptal as disclosed in Japanese Patent Application No. 8743/1972, oxazoline thione as disclosed in U.S. Pat. 3,251,691, triazolothiadiazole as disclosed in Japanese Patent Application No. 17932/1968, azaindenes such as the tetrazaindenes as disclosed in U.S. Pat. Nos. 2,444,605, 2,444,606 and 2,450,397, and Japanese Patent Application 10166/1964, and 10516/1967, pentazaindenes as disclosed in U.S. Pat. No. 2,713,541 and Japanese Patent Application 13495/1968, and urazole as disclosed in U.S. Pat. No. 2,708,161; image tone controllers; hardening agents, e.g., aldehydes, such as glyoxal as disclosed in U.S. Pat. No. 1,870,354, glutalaldehyde as disclosed in British Pat. No. 825,544, N-methylol substituted compounds, such as N,N'-dimethylolurea, dioxane derivatives, e.g., sulfonic acid salts, alkylnaphthalene sulfonic acid salts, alkyl sulfates, N-acyl-N-alkyltaurine as disclosed in U.S. Pat. No. 2,739,891, maleopimalates as disclosed in U.S. Pat. Nos. 2,359,980, 2,409,930 and 2,447,750, other anionic surface active agents as disclosed in U.S. Pat. Nos. 2,823,123 and 3,415,649, amphoteric surface active agents, e.g., as disclosed in U.S. Pat. No. 3,726,683 and British Pat. No. 1,159,825, etc.; plasticizers such as glycerine, diols as disclosed in U.S. Pat. No. 2,960,404, aliphatic triols as disclosed in U.S. Pat. No. 3,520,694, etc.; sensitizers and development accelerators such as ethers, esters, or amides of polyalkylene oxides as disclosed in U.S. Pat. No. 2,708,161, other polyalkylene oxide derivatives as disclosed in British Pat. No. 1,145,186, quarternary ammonium salts as disclosed in U.S. Pat. No. 3,772,021, thio-ether compounds as disclosed in U.S. Pat. Nos. 3,046,132 to 3,046,135, thiomorpholines, pyrrolidines, derivatives of urethane or urea, imidazole derivatives, 3-pyrazolidones, and organic mercury compounds as disclosed in U.S. Pats. Nos. 2,728,665 and 3,420,668; fluorescent brightening agents such as the stilbenes, triazines, oxazoles, coumarins, etc.; ultraviolet absorbers such as the benzophenones, the benzotriazoles the thiazolidines, etc.; matting agents such as silica as disclosed in Swiss Pat. No. 330,158, glass powders as disclosed in French Pat. No. 1,296,995, carbonates of alkaline earth metals, cadmium or zinc as disclosed in British Pat. No. 1,173,181, starch as disclosed in U.S. Pat. No. 2,322,037, starch derivatives as disclosed in British Pat. No. 981,198, polyvinylalcohol as disclosed in Japanese Patent Application 3643/1969, polystyrene particles, polymethylmethacrylate particles, polyacrylonitrile particles as disclosed in U.S. Pat. No. 3,079,257, polycarbonate particles as disclosed in U.S. Pat. No. 3,022,169, etc.; lubricating agents such as the higher alcohol esters of higher fatty acids as disclosed in U.S. Pats. Nos. 2,588,756, and 3,121,060, casein as disclosed in U.S. Pat. No. 3,295,979, the calcium salt of higher fatty acids as disclosed in British Pat. No. 1,263,722, silicone compounds as disclosed in U.S. Pats. Nos. 3,042,522 and 3,489,567, dispersed liquid paraffin, etc.

In the silver halide emulsion, color couplers and dispersing agents for the couplers can be included. Suitable examples of couplers are disclosed in the following U.S. Patents.

Yellow: U.S. Pats. Nos. 3,277,155; 3,415,652; 3,447,928; 3,408,194; 2,875,057; 3,265,506; 3,409,439; 3,551,155; 3,551,156; 3,582,322, etc.

Magenta: U.S. Pat Nos. 2,600,788; 2,983,608; 3,006,759; 3,062,653; 3,214,437; 3,253,924; 3,311,476; 3,419,391; 3,419,808; 3,476,560; 3,582,322, etc.

Cyan: U.S. Pat. Nos. 2,474,293; 2,698,794; 3,034,892; 3,214,437; 3,253,924; 3,311,476; 3,458,315; 3,582,322; 3,591,383; etc.

The silver halide photographic emulsion of the invention can contain gelatin, gelatin derivatives such as phthalated gelatin or malonated gelatin, agar, collodion, cellulose derivative such as hydroxyethyl cellulose or carboxymethyl cellulose watersoluble starch such as dextrin and hydrophilic polymers such as polyvinyl alcohol, polyvinyl pyrrolidone, copolymers containing vinyl pyrrolidone, polyacrylamide or polystyrene sulfonate, other synthetic hydrophilic polymers and natural polymers as a protective colloid. Suitable gelatin derivatives include those formed by the reaction of gelatin with aromatic sulfonyl chlorides, aromatic acid chlorides, aromatic acid anhydrides, isocyantes, 1,4-diketones, as disclosed in U.S. Pat. No. 2,614,928, trimellitic acid, as disclosed in Japanese Patent Application No. 5514/1964, aromatic glycidyl ethers as disclosed in Japanese Patent Application 26845/1967, maleimides, maleamic acid, unsaturated aliphatic diamides as disclosed in British Pat. No. 1,033,189, polyoxyalkylene derivatives as disclosed in U.S. Pat. No. 3,312,553 and polymer-grafted gelatins, e.g., grafted with acrylic acid, methacrylic acid, acrylate esters, methacrylate esters, acrylamide, acrylonitrile, styrene, etc. Specific examples of synthetic hydrophilic polymers, include homopolymers or copolymers of vinylalcohol, N-vinylpyrrolidone, hydroxyalkylmethacrylate, methacrylamide, N-substituted methacrylamide, etc., copolymers of these monomers with methacrylic esters, vinyl acetate, styrene, etc., and a monomer as described previously copolymerized with maleic anhydride, maleic acid, etc.

The silver halide emulsion of the present invention can be coated on any suitable support such as, e.g., glass, ceramic, metal, films of polymers such as cellulose derivatives such as cellulose nitrate, cellulose acetate, cellulose acetate-butyrate, etc., polyethylene terephthalate, polyalkylmethactylate, polystyrene, polyvinyl chloride, polyvinyl alcohol, partly formalized polycarbonate, polyamide, etc., baryta paper, resin coated paper or synthetic paper using conventional techniques.

The spectral sensitizers used in this invention can be added to the emulsion as an aqueous solution or an organic solvent solution. The organic solvent is miscible with water such as methanol, ethanol, methyl cellosolve or pyridine. The amounts of each of the sensitizers added are those conventionally used for spectral sensitization, for example, about $5 \times 10^{-3}$ mol to $1 \times 10^{-6}$ mol per mol of silver. The weight ratio of the dye represented by the general formula (I) and the dye represented by the general formula (II) can be decided by rountine testing and is generally about 10:1 to 1:10.

The invention is illustrated in greater detail by the following examples but the invention is not to be construed as being limited to these examples. Unless otherwise indicated, all parts, percents, ratios and the like are by weight.

EXAMPLES

To 1 kg of a silver chloroiodobromide emulsion (iodide content 0.25 mol%, bromide content 20 mol%) propared conventionally, 0.1% methanol solutions of the sensitizing dyes represented by the general formulae (I) and (II) in the amounts shown in Table 1, were added and then the emulsions was coated on a cellulose triacetate film and dried.

Thus prepared photographic light-sensitive film was exposed through a step wedge and a green filter (Kodak Wratten Filter No. 58) and a blue filter (Kodak Wratten Filter No. 47B) to a sensitometer having a light source of a color temperatures of 5400° K for 1/20th of a second. On the other hand, it was exposed for 1/5the of a second by means of a diffraction lattice type spectral photographic device having a tungusten light source of a color temperature of 2666° K to obtain a spectrogram of the sample.

The thus exposed photographic material was developed with the following developer at 20° C for 2 minutes, followed by stopping, fixing and washing it to provide strips having black and white images. The density of the images was measured using an S-type densitometer manufactured by the Fuji Photo Film Co., Ltd. to determine the sensitivity under a green filter ($S_g$) and under a blue filter ($S_b$), and the fog value. The sensitivity was based on the optical density corresponding to (fog + 0.20) and is shown as a relative value in Table 1.

| Developer Composition | |
|---|---|
| Water | 500 ml |
| Metol | 2 g |
| Sodium sulfite | 40 g |
| Hydroquinone | 4 g |
| Sodium carbonate (monohydrate) | 28 g |
| Potassium bromide | 1 g |
| Water to make | 1 liter |

When the developer was used, an equal amount by volume of water to developer used was added.

Figure 1:
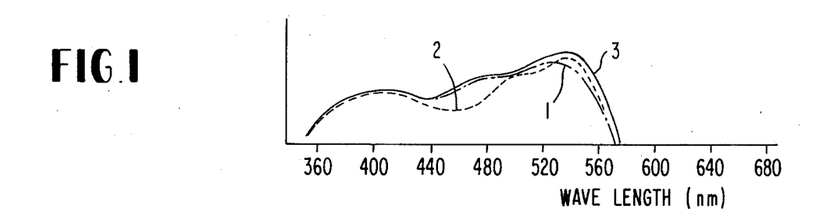
FIGS. 1 to 2 are spectral sensitivity curves of silver chloroiodobromide emulsions containing sensitizers singly or in combination.
Figure 2:
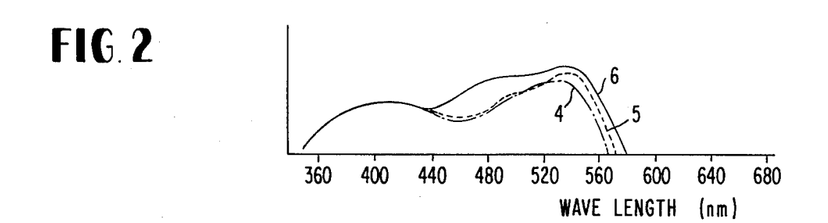
Figure 3:
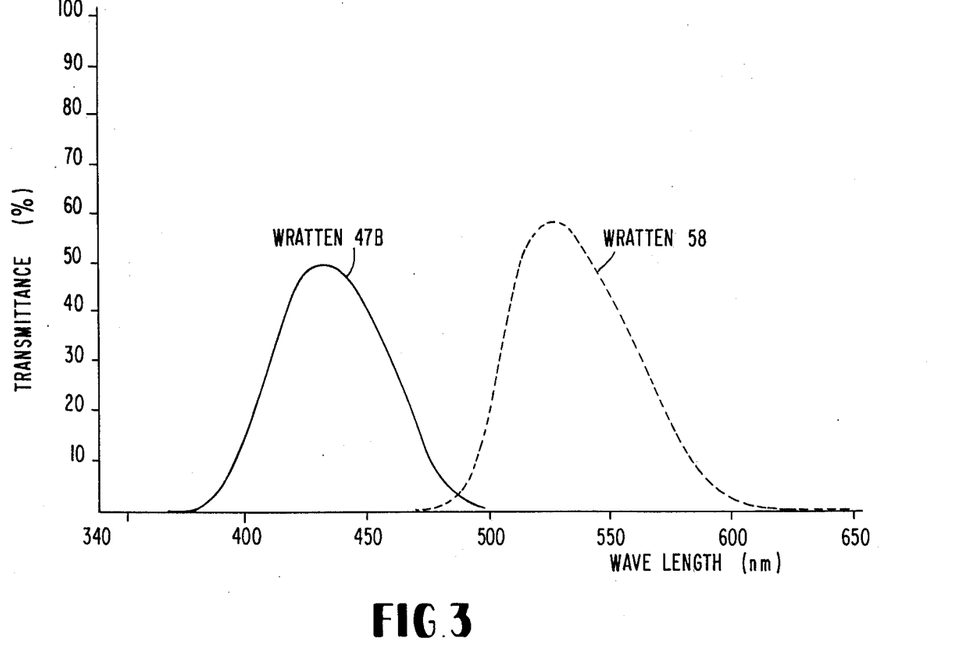
FIG. 3 is the spectral transmitting curves of the filters used (Kodak Wratten No. 47B and Kodak Wratten No. 58).

| Example | Dye and Amount thereof ($\times 10^{-5}$ mole) | Dye and Amount thereof ($\times 10^{-5}$ mole) | Dye and Amount thereof ($\times 10^{-5}$ mole) | SG Relative Value | SB Relative Value | Fog | Spectogram |
|---|---|---|---|---|---|---|---|
| 1 | (I-b) — | — | — | — | 100 (base point) | 0.04 | |
| | 8 | — | — | 100 (base point) | 103 | 0.04 | |
| | 16 | — | — | 115 | 115 | 0.04 | |
| | 32 | — | — | 125 | 125 | 0.05 | |
| | — | (II-2) 8 | — | 128 | 110 | 0.04 | |
| | (I-b) 16 | (II-2) 8 | — | 165 | 125 | 0.05 | |
| | 32 | 8 | — | 165 | 130 | 0.05 | |
| 2 | (I-f) 8 | — | — | 90 | 105 | 0.04 | |
| | 16 | — | — | 120 | 122 | 0.04 | |
| | (I-f) 16 | (II-2) 8 | — | 170 | 120 | 0.05 | |
| | 32 | 8 | — | 170 | 125 | 0.06 | |
| 3 | — | 8 | — | 160 | 114 | 0.05 | FIG. 2-5 |
| | (I-b) 8 | (II-23) 16 | — | 180 | 125 | 0.05 | |
| | 16 | 16 | — | 185 | 125 | 0.05 | |
| 4 | (I-c) 8 | — | — | 90 | 103 | 0.04 | FIG. 2-4 |
| | 16 | — | — | 115 | 120 | 0.04 | |
| | 32 | — | — | 150 | 138 | 0.05 | FIG. 1-1 |
| | — | (II-8) 4 | — | 132 | 120 | 0.05 | |
| | — | 8 | — | 178 | 125 | 0.06 | FIG. 1-2 |
| | (I-c) 16 | (II-8) 8 | — | 190 | 130 | 0.06 | |
| | 32 | 8 | — | 200 | 143 | 0.06 | FIG. 1-3 |

-continued

| Example | Dye and Amount thereof (×10⁻⁵mole) | Dye and Amount thereof (×10⁻⁵mole) | Dye and Amount thereof (×10⁻⁵mole) | SG Relative Value | SB Relative Value | Fog | Spectogram |
|---|---|---|---|---|---|---|---|
| 5 | — | — | (A) 8 | — | 125 | 0.04 | |
|   | (I-c) 16 | (II-8) 8 | (A) 8 | 190 | 130 | 0.06 | |
| 6 | — | (II-15) 8 | — | 150 | 103 | 0.05 | |
|   | (I-c) 32 | 8 | — | 186 | 143 | 0.05 | |
|   | 8 | 16 | — | 205 | 125 | 0.05 | |
|   | 16 | 16 | — | 210 | 125 | 0.05 | |
| 7 | — | (II-6) 4 | — | 153 | 110 | 0.05 | |
|   | — | 8 | — | 180 | 118 | 0.05 | |
|   | (I-f) 8 | (II-6) 8 | — | 197 | 120 | 0.05 | |
|   | 16 | 8 | — | 197 | 125 | 0.05 | |
| 8 | (I-f) 8 | (II-6) 8 | (A) 8 | 197 | 130 | 0.05 | |
| 9 | (I-c) 8 | (II-23) 8 | — | 193 | 148 | 0.05 | FIG. 2-6 |
|   | 16 | 8 | — | 190 | 135 | 0.05 | |
|   | 8 | 16 | — | 222 | 128 | 0.05 | |
| 10 | (I-c) 16 | (II-6) 8 | — | 220 | 125 | 0.04 | |
|   | 32 | 8 | — | 225 | 164 | 0.05 | |
| 11 | (I-e) 16 | — | — | 90 | 105 | 0.04 | |
|   | 32 | — | — | 106 | 118 | 0.05 | |
|   | (I-e) 16 | (II-23) 16 | — | 170 | 128 | 0.05 | |
|   | 32 | 16 | — | 172 | 128 | 0.05 | |

The Table 1 shows that the spectral sensitization effects where the sensitizers are combined are remarkably enhanced to a greater extent than those where the sensitizers are used alone, and that the sensitivity of the silver halide in the inherent sensitivity region is also increased.

When the combined sensitizing dyes are further combined with a sensitizing dye, a supersensitization effect can be increased. Suitable examples of such a dye are disclosed in U.S. Pats. Nos. 3,527,641, 3,522,052, 3,615,635, 3,617,293, 3,617,294, 3,667,960, 3,628,964 and 3,814,609, Belgian Pat. No. 765,244, Japanese Patent Publication 4936/68, and Jananese Patent Application 3038/72.

The results in Table 1 show that the combined sensitizing dyes of the invention can be used together with a blue-sensitive sensitizing dye. The dye can be added to the silver halide emulsion in the same step as the addition of the dyes of the general formula (I) and (II). The blue-sensitive sensitizing dye is an apomerocyanine. The dye is, for example, represented by the formula (A) below, but is not limited to the formula.

(A)

The amount of the dye respresented by the formula (A) is substantially the same as those of the general formulae (I) and (II), and the weight ratio of the dye is about 1/10 to 10 parts, preferably 1/2 to 1 part, based on 1 part of the dye represented by the general formula (I).

EXAMPLE 2

Example 2 presents a comparison between dye combination of the present ivention and dye combination as are disclosed in U.S. Pat. No. 3,698,910 Sakazume et al.

The same procedure as that of Example was conduced, using the dyes represented by the following general formula

| | W | X | Y | | |
|---|---|---|---|---|---|
| Dye-1 | H | $CH_2COOH$ | $C_2H_5$ | Present inv. | (I) |
| Dye-2 | H | $CH_2COOH$ | $C_6H_5$ | Sakazume | (I) |
| Dye-3 | $CH_3$ | $(CH_2)_2COOH$ | $C_2H_5$ | this inv. | (I) |
| Dye-4 | $CH_3$ | $(CH_2)_2COOH$ | $C_6H_5$ | Sakazume | (I) |
| Dye-5 | Cl | $CH_2CH_2OCH_2CH_2OH$ | $C_6H_5$ | Present inv. | (II) |
| Dye-6 | Cl | $CH_2CH_2OC_2H_5$ | $C_6H_5$ | Sakazume | (II) |
| Dye-7 | H | $CH_2CH_2OCH_2CH_2-OCOCH_3$ | $C_6H_5$ | this inv. | (II) |
| Dye-8 | H | $CH_2CH_2OCOCH_3$ | $C_6H_5$ | Sakazume | (II) |

The results obtained were as follows:

| | No. | Dye and an amount thereof to be used ×10⁻⁵mole | | | SG Relative Value | SB Relative Value | Fogging |
|---|---|---|---|---|---|---|---|
| This Invention | 1 | — | | — | — | 100 | 0.02 |
| | | (1) | 8 | (5) | 16 | 100 | 122 | 0.05 |
| | | | 16 | | 16 | 118 | 132 | 0.05 |
| | | | 32 | | 16 | 118 | 148 | 0.06 |
| For Comparison | 2 | (2) | 8 | (6) | 16 | 51 | 110 | 0.06 |
| | | | 16 | | 16 | 73 | 114 | 0.06 |
| | | | 32 | | 16 | 40 | 63 | 0.07 |

-continued

| | No. | Dye and an amount thereof to be used ×10⁻⁵mole | | SG Relative Value | SB Relative Value | Fogging |
|---|---|---|---|---|---|---|
| This Invention 3 | (1) | 8 | (7) 16 | 104 | 118 | 0.05 |
| | | | 16 | 123 | 130 | 0.06 |
| | | | 32 | 127 | 148 | 0.06 |
| For Comparison 4 | (2) | 8 | (8) 16 | 56 | 108 | 0.06 |
| | | | 16 | 77 | 118 | 0.06 |
| | | | 32 | 46 | 70 | 0.07 |
| This Invention 5 | (3) | 8 | (5) 32 | 132 | 116 | 0.06 |
| | | | 16 | 124 | 130 | 0.05 |
| | | | 32 | 128 | 142 | 0.06 |
| For Comparison 6 | (4) | 8 | (6) 32 | 92 | 110 | 0.07 |
| | | | 16 | 88 | 110 | 0.06 |
| | | | 32 | 48 | 60 | 0.07 |
| This Invention 7 | (3) | 8 | (7) 32 | 137 | 114 | 0.06 |
| | | | 16 | 120 | 134 | 0.06 |
| | | | 32 | 137 | 142 | 0.06 |
| For Comparison 8 | (4) | 8 | (8) 32 | 92 | 112 | 0.07 |
| | | | 16 | 92 | 118 | 0.06 |
| | | | 32 | 44 | 74 | 0.07 |

From the above, it is easily that the combination of the dyes used in the present invention provides superior green and blue sensitivities as compared with those of the Sakazume et al, i.e., the dyes of the present invention are superior to those of Sakazume et al where the moiety corresponding to $R_2$ of the present invention is monoaryl and the moiety corresponding to $R_6$ of the present invention is alkoxyalkyl per se, as compared to hydroxyalkoxyalkyl or acyloxyalkoxyalkyl.

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion containing a spectrally sensitizing amount of a sensitizing dye represented by the general formula (I)

and a sensitizing dye represented by the formula (II)

wherein $Z_1$ and $Z_2$ each is an atomic group necessary to complete a benzoxazole ring or a naphthoxazole ring; $R_1$ is an alcohol group or an allyl group; $R_2$ is an allkyl group, or an allyl group; $R_3$ is an unsubstituted lower alkyl group, a hydroxyalkyl group or a carboxyalkyl group; $R_4$ is same as $R_1$; $R_5$ is an alkyl group, an allyl group or a phenyl group; $R_6$ is an alkoxycarbonylalkyl group, an hydroxyalkoxyalkyl group, an acyloxyalkoxyalkyl group, an N-(N,N-dialkylaminoaklyl) carbamoylalkyl group, an N-(N,N,N-trialkylammonium) carbamoylalkyl group or an N,N,N-trialkylammoniumalkyl group; $X^-$ is an acid anion, an $n$ is 0 or 1.

2. The silver halide photographic emulsion is claimed in?claim 1, wherein said silver halide is silver chlorobromide or silver chloroiodobromide.

3. The silver halide photographic emulsion as claimed in claim 1, wherein said silver halide comprises particles having a (1 0 0) plane.

4. The silver halide photographic emulsion as claimed in claim 1, wherein $R_2$ and $R_3$ each is a lower alkyl group.

5. The silver halide photographic emulsion as claimed in claim 1, wherein $R_6$ is an alkoxycarbonylalkyl group, a hydroxyalkoxyalkyl group or an acyloxyalkoxylalkyl group.

6. The silver halide photographic emulsion as claimed in claim 1, wherein $R_2$ and $R_3$ each is a lower alkyl group and $R_6$ is an alkoxycarbonylalkyl group, a hydroxyalkoxyalkyl group or an acyloxyalkoxyalkyl group.

7. The silver halide photographic emulsion as claimed in claim 1, wherein said combination of dyes is (1) a combination of 1,3-diethyl-5-[β-(3-γ-sulfopropyl-2-benzoxcazolidene)ethylidene]-2-thiohydantoin (sodium salt) and 1-[β-(2-hydroxyethoxy)ethyl]-5-]{(3-γ-sulfopropyl)-5-chloro-2-benzoxazolidene}ethylidene]-3-phenyl-2-thiohydantoin (phyridinium salt), or (2) a combination of 1,3-diethyl-5-[{(3-γ-sulfopropyl-2-benzoxazolidene)}ethylidene]-3-ethyl-2-thiohydantoin (sodium salt) and 1-methoxycarbonylmethyl-5-[{(3-γ-sulfopropyl-2-benzoxazolidene}ethylidene]-3-phenyl-2-thiohydantoin (triethylamine salt).

8. The silver halide photographic emulsion as claimed in claim 1, wherein said benzoxazole ring or naphthoxazole ring is substituted with one or more of a halogen atom, a lower alkyl group, a lower alkoxy group, a hydroxy group, a trifluoromethyl group, a lower alkoxy carbonyl group, an acyl group, or a monoaryl group as substituents; wherein the alkyl group of $R_1$ is an unsubstituted alkyl group having 1 to 8 carbon atoms or a substituted alkyl group having 1 to 8 carbon atoms and containing one or more of a hydroxy group, an alkoxy group, an acylocy group, a carboxy group, an alkoxycarbonyl group, a sulfo group, a sulfonato group, or an aryl group as substituents; wherein said alkyl group for $R_2$ has from 1 to 4 carbon atoms in the alkyl moiety thereof and is a group as described for $R_1$; and wherein the alkyl moieties of said substituents for $R_6$ have from 1 to 4 carbon atoms.

9. The silver halide photographic emulsion of Claim 2, wherein said silver halide contains from about 0.1 to 4 mol % silver iodide and comprises particles of a size of about 0.04 to 2 microns.

10. The silver halide photographic emulsion as claimed in Claim 1, wherein said emulsion includes at least one color coupler.

11. A silver halide photographic light-sensitive material comprising a support having thereon the silver halide photographic emulsions of claim 1.

* * * * *